US012752592B2

(12) United States Patent
Seong

(10) Patent No.: US 12,752,592 B2
(45) Date of Patent: Oct. 6, 2026

(54) DEFROSTING METHOD AND DEFROSTING APPARATUS FOR VEHICLE

(71) Applicants: Hyundai Motor Company, Seoul (KR); Kia Corporation, Seoul (KR)

(72) Inventor: Beom Chang Seong, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 26 days.

(21) Appl. No.: 18/977,183

(22) Filed: Dec. 11, 2024

(65) Prior Publication Data

US 2026/0014833 A1 Jan. 15, 2026

(30) Foreign Application Priority Data

Jul. 15, 2024 (KR) ........................ 10-2024-0092978

(51) Int. Cl.
*B60H 1/00* (2006.01)

(52) U.S. Cl.
CPC ....... *B60H 1/0073* (2019.05); *B60H 1/00785* (2013.01)

(58) Field of Classification Search
CPC .... B60H 1/00; B60H 1/0073; B60H 1/00785; B60S 1/02; B60S 1/58; B60R 16/025; B60R 11/04
See application file for complete search history.

(56) References Cited

U.S. PATENT DOCUMENTS

| | | | | |
|---|---|---|---|---|
| 10,220,675 | B1 * | 3/2019 | Reed | B60H 1/00657 |
| 2004/0100217 | A1 * | 5/2004 | Neubauer | G01N 21/94 318/480 |
| 2007/0182816 | A1 * | 8/2007 | Fox | G02B 27/0101 348/118 |
| 2013/0103257 | A1 * | 4/2013 | Almedia | B60Q 1/303 701/36 |
| 2020/0198587 | A1 * | 6/2020 | Du | B60S 1/485 |
| 2021/0094386 | A1 * | 4/2021 | Sandhu | B60H 1/00657 |
| 2021/0101564 | A1 * | 4/2021 | Banno | G06V 20/56 |

* cited by examiner

*Primary Examiner* — Tan Q Nguyen
(74) *Attorney, Agent, or Firm* — Fox Rothschild LLP

(57) ABSTRACT

A defrosting method for a vehicle includes steps of: training a neural network model with collected image data, determining whether frost is present on a glass of a vehicle based on the trained neural network model, and performing control of defrosting according to whether the frost is present. A defrosting apparatus includes a neural network model training module configured to train the neural network model; a frost presence determination module configured to determine whether frost is present on the glass of the vehicle; and a defrosting control module configured to control defrosting according to whether the frost is present. The above modules of the defrosting apparatus constitute one or more controllers.

17 Claims, 7 Drawing Sheets

FIG. 6A
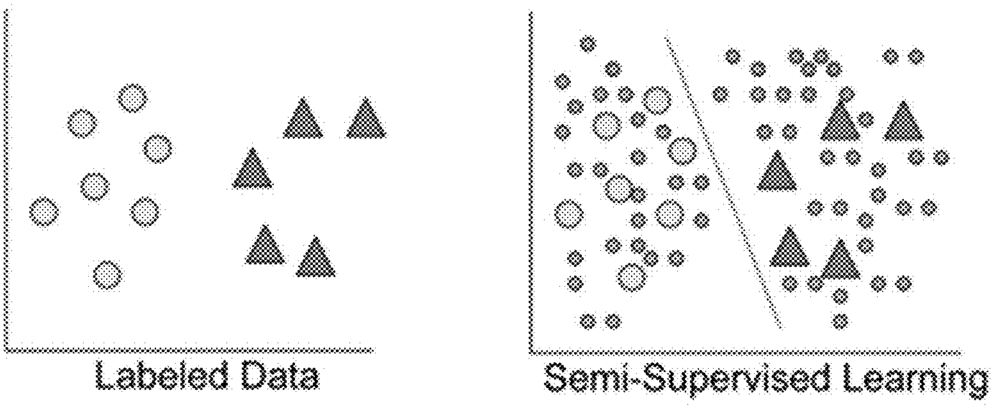
(a1)
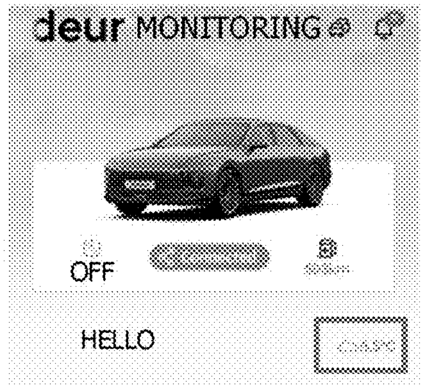
(a2)
FIG. 6B
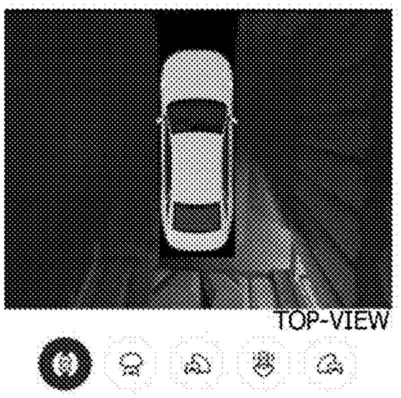
(a3)
FIG. 6C

DEFROSTING METHOD AND DEFROSTING APPARATUS FOR VEHICLE

CROSS REFERENCE TO RELATED APPLICATION

The present application claims under 35 U.S.C. § 119(a) the benefit of Korean Patent Application No. 10-2024-0092978 filed on Jul. 15, 2024, the entire contents of which are incorporated by reference herein.

BACKGROUND

1. Technical Field

The present disclosure relates to a defrosting method and a defrosting apparatus for a vehicle, more particularly, to a smart defrost system based on a neural network.

2. Description of the Related Art

When the outside temperature is low, like in winter, various methods of removing frost generated on a windshield of a vehicle can be tried. For example, it is possible to melt frost using hot water or by scraping frost using a scraper, and it may be possible to cover the windshield with an anti-frost cover.

However, a vehicle user should ensure there is a sufficient supply of windshield washer fluid in the vehicle, so as to avoid damage to the windshield caused by frozen water. In addition, there are other problems when frost is not completely removed, including that the windshield may be easily scratched, the cover must be stored in the vehicle during winter, and the cover may be wet after use.

In order to solve such problems, a defrosting method and apparatus for vehicle using a smart defrost system based on a neural network would be desirable.

SUMMARY

A defrosting method for a vehicle according to one embodiment includes training a neural network model with collected image data, determining whether frost is present on a glass of the vehicle based on the trained neural network model, and performing control of defrosting according to whether the frost is present.

The determining of whether the frost is present on the glass according to one embodiment may further include capturing an image of the glass of the vehicle using a camera mounted on the vehicle and determining whether the frost is present using the captured image of the glass of the vehicle.

The camera mounted in the vehicle according to one embodiment may include a camera mounted in the vehicle or a black box, and the glass of the vehicle may include a windshield of the vehicle.

In the determining of whether the frost is present on the glass according to one embodiment, whether the frost is present on the glass of the vehicle may be determined using an artificial intelligence or a neural network, when the frost is present on the glass of the vehicle, it is determined that the glass is in an abnormal state, and when the frost is not present on the glass of the vehicle, it is determined that the glass is in a normal state.

The collected image data according to one embodiment may include an image of the glass of the vehicle obtained through a camera mounted on the vehicle while the vehicle travels.

The capturing of the image of the glass according to one embodiment may further include performing control such that an emergency light is automatically turned on when an illumination of surroundings of the camera mounted on the vehicle or surroundings of the glass of which an image is to be captured is a preset illumination threshold or lower.

The defrosting method for a vehicle according to one embodiment may further include receiving from a user terminal a signal to request for removing or checking frost.

A defrosting apparatus for a vehicle according to one embodiment may include a neural network model training module which trains a neural network model with collected image data, a frost presence determination module which determines whether frost is present on a glass of the vehicle based on the trained neural network model, and a defrosting control module which controls defrosting according to whether the frost is present.

The frost presence determination module according to one embodiment may further include a vehicle glass image capturing module which capture an image of the glass of the vehicle using a camera mounted on the vehicle and determine whether frost is present using the captured image of the glass of the vehicle.

The camera mounted on the vehicle according to one embodiment may include a camera mounted in the vehicle or a black box, and the glass of the vehicle includes a windshield of the vehicle.

The frost presence determination module according to one embodiment may determine whether frost is present on the glass of the vehicle using an artificial intelligence or neural network, when the frost is present on the glass of the vehicle, it is determined that the glass is in an abnormal state, and when the frost is not present on the glass of the vehicle, it is determined that the glass is in a normal state.

The collected image data according to one embodiment may include an image of the glass of the vehicle obtained through the camera mounted on the vehicle while the vehicle travels.

The frost presence determination module according to one embodiment may further include an emergency light control module which performs control such that an emergency light is automatically turned on when an illumination of surroundings of the camera mounted on the vehicle or surroundings of the glass of which an image is to be captured is a preset illumination threshold or lower.

The defrosting apparatus for a vehicle according to one embodiment may further include a user terminal signal reception module which receives from a user terminal a signal to request for removing or checking frost.

The defrosting apparatus may include one or more controllers, e.g., corresponding to the above-described modules.

A vehicle may include the defrosting apparatus.

As provided herein, the defrosting apparatus and defrosting method are configured to remove frost from a glass (e.g., a windshield) of a vehicle. The term "frost" as referred to herein includes a deposit of ice crystals (e.g., white and/or clear) formed on a surface such as the glass or other vehicle surface such as when the air temperature falls below freezing (0° C.).

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIGS. 6A, 6B, and 6C are views illustrating the defrosting method for a vehicle according to one embodiment.

DETAILED DESCRIPTION OF EXEMPLARY EMBODIMENTS

Figure 1:
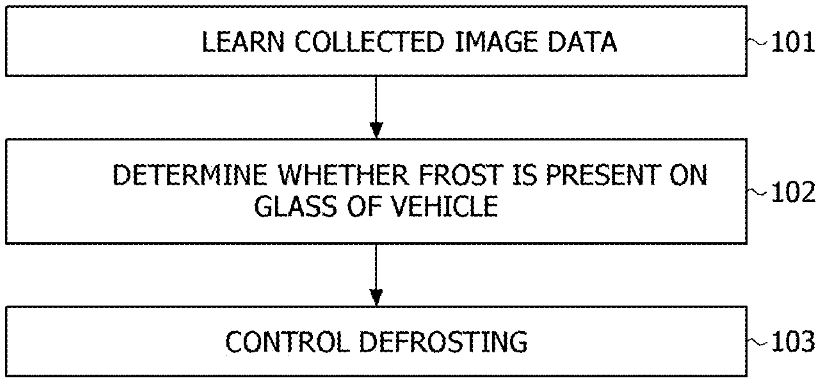
FIG. 1 is a flowchart illustrating a defrosting method for a vehicle according to one embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings.

However, the technical spirit of the present disclosure is not limited to some embodiments which will be described and may be implemented in various different forms, and one or more components of the embodiments may be selectively combined, substituted, and used within the range of the technical spirit of the present disclosure.

In addition, unless clearly and specifically defined otherwise by the context, all terms (including technical and scientific terms) used herein can be interpreted as having meanings customarily understood by those skilled in the art, and the meanings of generally used terms, such as those defined in commonly used dictionaries, will be interpreted in consideration of contextual meanings of the related art.

In addition, the terms used in the embodiments of the present disclosure are considered in a descriptive sense and not to limit the present disclosure.

In the present specification, unless specifically indicated otherwise by the context, singular forms include plural forms, and in a case in which "at least one (or one or more) among A, B, and C" is described, this may include at least one combination among all possible combinations of A, B, and C.

In addition, in descriptions of components of the present disclosure, terms such as "first," "second," "A," "B," "(a)," and "(b)" may be used.

The terms are only to distinguish one component from another component, and the essence, order, and the like of the components are not limited by the terms.

In addition, it should be understood that, when a first component is referred to as being "connected," "coupled," or "linked" to a second component, such a description may include both a case in which the first component is directly connected, coupled, or linked to the second component, and a case in which the first component is connected, coupled, or linked to the second component with a third component interposed therebetween.

In addition, when a first component is described as being formed or disposed "on or under" a second component, such a description includes both a case in which the two components are formed or disposed in direct contact with each other and a case in which one or more other components are interposed between the two components. In addition, when the first component is described as being formed "on or under" the second component, such a description may include a case in which the first component is formed at an upper side or a lower side with respect to the second component.

Hereinafter, when embodiments are described in detail with reference to the accompanying drawings, components that are the same or correspond to each other will be denoted by the same or corresponding reference numerals in all drawings, and redundant descriptions will be omitted.

FIG. 1 is a flowchart illustrating a defrosting method for a vehicle according to one embodiment.

According to one embodiment, each operation of the defrosting method for a vehicle may be performed by at least some components of a defrosting apparatus for a vehicle which will be described below.

In operation 101, the defrosting apparatus for a vehicle may train a neural network model with collected image data. The neural network model may include various neural network models.

In operation 102, the defrosting apparatus for a vehicle may determine whether frost is present on a glass of a vehicle on the basis of the trained neural network model. The defrosting apparatus for a vehicle may determine whether the frost is present on the glass of the vehicle using the trained neural network model.

In operation 103, the defrosting apparatus for a vehicle may control defrosting based on the presence or absence of frost. When frost is present, the defrosting apparatus for a vehicle may control at least some components inside or mounted on the vehicle to defrost. The components mounted in the vehicle may include an air conditioning module, a heating apparatus/appliance, a liquid jet, a removal tool/appliance including a rubber material, etc. When frost is present, the defrosting apparatus for a vehicle may control the vehicle or the components mounted in the vehicle to perform a defrosting operation.

The components of the defrosting apparatus for a vehicle may include at least some of machines, circuits, semiconductors, computing devices, memories, processors, data transceivers, etc., and at least some of the components may be mechanically/physically/communicatively/electrically connected to at least some other components.

According to one embodiment, the defrosting apparatus for a vehicle may output/transmit/display at least some components described/included in the specification or drawings to/to/on a user/manager terminal/display. A manager terminal may include at least some of mobile devices, computing devices, etc.

According to one embodiment, the defrosting apparatus for a vehicle may include at least some of all the components described/included in the specification or the drawings.

According to one embodiment, the defrosting apparatus for a vehicle may determine whether frost is present by capturing an image of the glass of the vehicle using a camera mounted on the vehicle and using the captured image of the glass of the vehicle.

According to one embodiment, the camera mounted in the vehicle may include a camera mounted in the vehicle or in a black box, and the glass of the vehicle may include a windshield of the vehicle.

According to one embodiment, the defrosting apparatus for a vehicle may determine whether frost is present on the glass of the vehicle, determine that the glass is abnormal when the frost is present on the glass of the vehicle, and determine that the glass is normal when the frost is not present on the glass of the vehicle.

According to one embodiment, the collected image data may include an image of the glass of the vehicle obtained through the camera mounted on the vehicle while the vehicle travels.

According to one embodiment, the defrosting apparatus for a vehicle may control an emergency light to be automatically turned on when an illumination of surroundings of the camera mounted on the vehicle or the glass of which the image is captured is a preset illumination threshold or less.

According to one embodiment, the defrosting method for a vehicle may further include an operation of receiving a signal requesting removal or presence of the frost from a user terminal.

The user terminal may include at least some of computing devices, mobile communication devices, etc.

According to one embodiment, the neural network model in the defrosting apparatus for a vehicle is applied to a head module (H/U), and the defrosting apparatus for a vehicle trains the neural network model with image data which are classified as normal image data/normal state (frost X) and abnormal image data/abnormal state (frost O). Then, when a function in the Bluelink™ is turned on, the defrosting apparatus for a vehicle may determine whether frost is present using an image of the windshield of the vehicle received from the built-in cam (e.g. built-in camera) and selectively perform a Defrost function.

According to one embodiment, the defrosting apparatus for a vehicle may determine that the windshield is covered with frost using an image of the built-in cam and may be operated, and the determination of whether the frost is present on the windshield using the image of the built-in cam may be based on an artificial intelligence (trained neural network). Data used for training the neural network may include an image obtained through the built-in cam while the vehicle actually travels.

According to one embodiment, the defrosting apparatus for a vehicle may compare images before and after defrosting to prevent incorrect determination of the presence or absence of frost. In addition, the defrosting apparatus for a vehicle may control the emergency light to be turned on in a case in which an image of the built-in cam is collected in a completely dark environment.

According to one embodiment, the defrosting apparatus for a vehicle may further include the emergency light.

According to one embodiment, the defrosting apparatus for a vehicle may check satisfaction of a user through the user terminal, and when the user satisfies, the defrosting apparatus for a vehicle may determine the images before and after defrosting as highly reliable data, and collect the images for later training.

Figure 2:
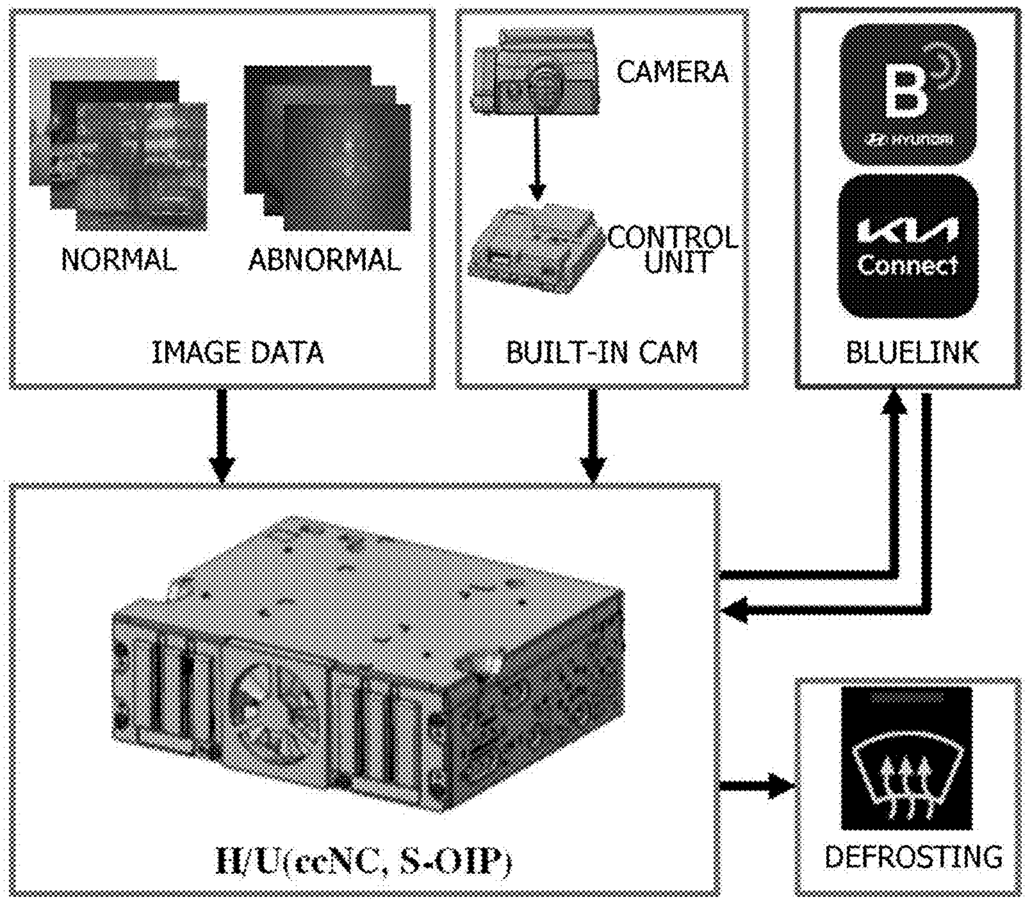
FIG. 2 is a view illustrating a process of the defrosting method for a vehicle according to one embodiment.

FIG. 2 is a view illustrating a process of the defrosting method for a vehicle according to one embodiment.

According to one embodiment, as a neural network model operation is possible in a platform (e.g. ccNC: connected car Navigation Cockpit/S-OIP: Smart Onboard Infotainment Platform) to which a graphic processing module (GPU) and a neural processing module (NPU) are applied, the defrosting apparatus for a vehicle may perform control such that the neural network model is trained based on image data, a case in which the windshield of the vehicle is covered with frost is determined, and defrosting is performed through remote control before a driver gets into the vehicle so that the driver can drive the vehicle immediately when the driver arrives at the vehicle.

Referring to FIG. 2, in a provided algorithm of the defrosting apparatus for a vehicle, the neural network model applied to the H/U is trained with collected image data, a state in which the windshield of the vehicle, of which an image is captured by a front camera, is covered with frost is determined, and defrosting is performed remotely, and this shows a process of recognizing the state of the windshield of the vehicle and determining whether the frost is present.

According to one embodiment, the defrosting apparatus for a vehicle may train the neural network model with a sufficient amount of data collected in advance classified as a normal group (frost X) and an abnormal group (frost O). A model provided as an open source may be used as the neural network model, and the defrosting apparatus for a vehicle may perform fine-tuning using obtained image data.

According to one embodiment, when a subscriber (a user of the vehicle) of a vehicle application such as the Bluelink™ pushes, for example, a "smart defrosting" function/button in an application provided on a screen of the user terminal, the defrosting apparatus for a vehicle may activate the built-in cam of the vehicle to check a state of the windshield of the vehicle at that time point.

According to one embodiment, the defrosting apparatus for a vehicle may determine whether the windshield is covered with frost (abnormal) or is not covered with frost (normal) using the neural network model. When the frost is present, the defrosting function in an air conditioning module may be performed, and when the frost is not present, a current state may be maintained.

According to one embodiment, when the defrosting function is performed, the defrosting apparatus for a vehicle may check a state of the windshield again using the built-in cam by checking whether the frost is removed after the defrosting function is performed, and may output/transmit/provide a text/image such as "defrosting completion" through the application on the screen of the user terminal. When the defrosting function is not performed, the defrosting apparatus for a vehicle may output/transmit/provide a text/image such as "no frost" through the application on the screen of the user terminal.

Figure 3:
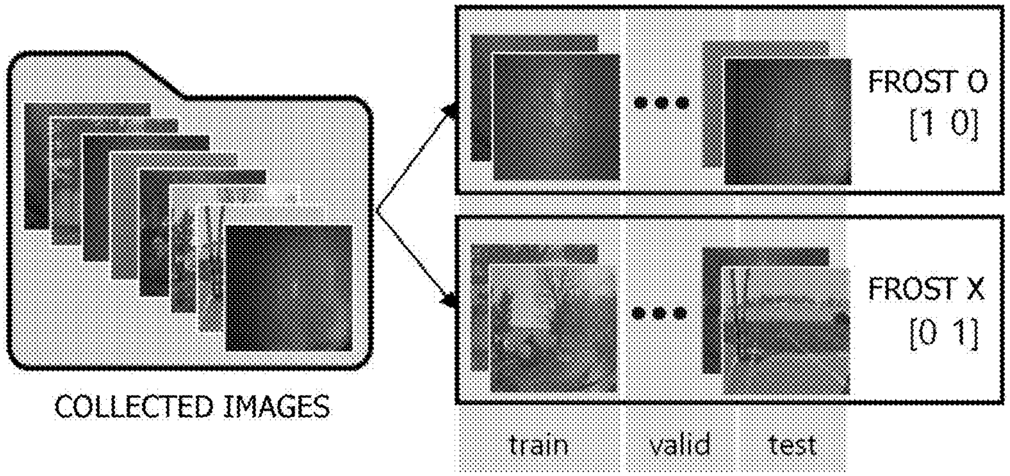
FIG. 3 is a view illustrating a data management process of the defrosting method for a vehicle according to one embodiment.

FIG. 3 is a view illustrating a data management process of the defrosting method for a vehicle according to one embodiment.

According to one embodiment, the defrosting apparatus for a vehicle may allow the driver to immediately drive the vehicle when the driver arrives at the vehicle by training the neural network based on images of the windshield of the vehicle collected by the built-in cam, detecting a state in which the windshield is covered with frost, and operating Defrost using the Bluelink™ in advance before the driver gets into the vehicle.

A process of preparing data to be applied to a neural network is described with reference to FIG. 3.

According to one embodiment, the defrosting apparatus for a vehicle may collect/prepare 100,000 images, in which frost is present or not present, of vehicles in which built-in cam (e.g. built-in cameras) are mounted. Since data sizes are different according to specifications of the built-in cam with 1920×1080 ($1^{st}$ generation), 2560×1440 ($2^{nd}$ generation), and 2980×1440 ($2.5^{th}$ generation), the defrosting apparatus for a vehicle may have a constant resolution by changing image sizes.

According to one embodiment, the defrosting apparatus for a vehicle may classify the images of which the sizes are changed as a normal set (frost X) and an abnormal set (frost O) and divide each set into train set/valid set/test set at ratio of 6:2:2.

Learning/training data are for training a model, validating data are for validating the model after the training, and testing data are for measuring the performance of the model after the training and validating. The normal set may be mapped as [0 1], and the abnormal set may be mapped as [1 0]. The number of images, a resolution after the change, a ratio of train/valid/test may be variably applied according to performance.

Figure 4:
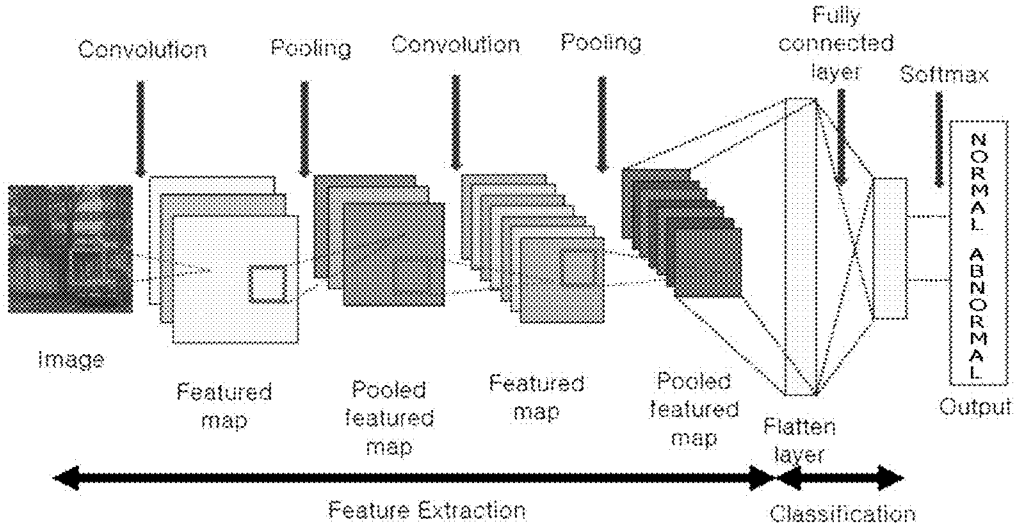
FIG. 4 is a view illustrating a process of training a neural network for the defrosting method for a vehicle according to one embodiment.

FIG. 4 is a view illustrating a process of training a neural network for the defrosting method for a vehicle according to one embodiment.

The process of training a neural network is described with reference to FIG. 4. The neural network model is a convolution neural network (CNN). This is a rough structure, and a model of which the performance is validated and an open source is provided may be used for actual application.

According to one embodiment, the defrosting apparatus for a vehicle may determine whether frost is present and perform defrosting before the driver (the user of the vehicle) arrives at the vehicle, and the neural network model to be used is not specific and may be any of various models.

According to one embodiment, in the defrosting apparatus for a vehicle may progress/perform fine tuning corresponding to the present disclosure by applying the neural network model.

According to one embodiment, in this case, the defrosting apparatus for a vehicle may change specific parameters for a channel, a filter, a stride, a pooling, a layer, and padding in succession to make optimal performance through a process of back propagation.

According to one embodiment, since the normal state (frost X) is set to [1 0] and the abnormal state (frost O) is set to [0 1], the defrosting apparatus for a vehicle may change the parameters by performing training such that a value finally output after Softmax operation is close to [1 0] in the normal state and [0 1] in the abnormal state after the training with training data.

Figure 5:
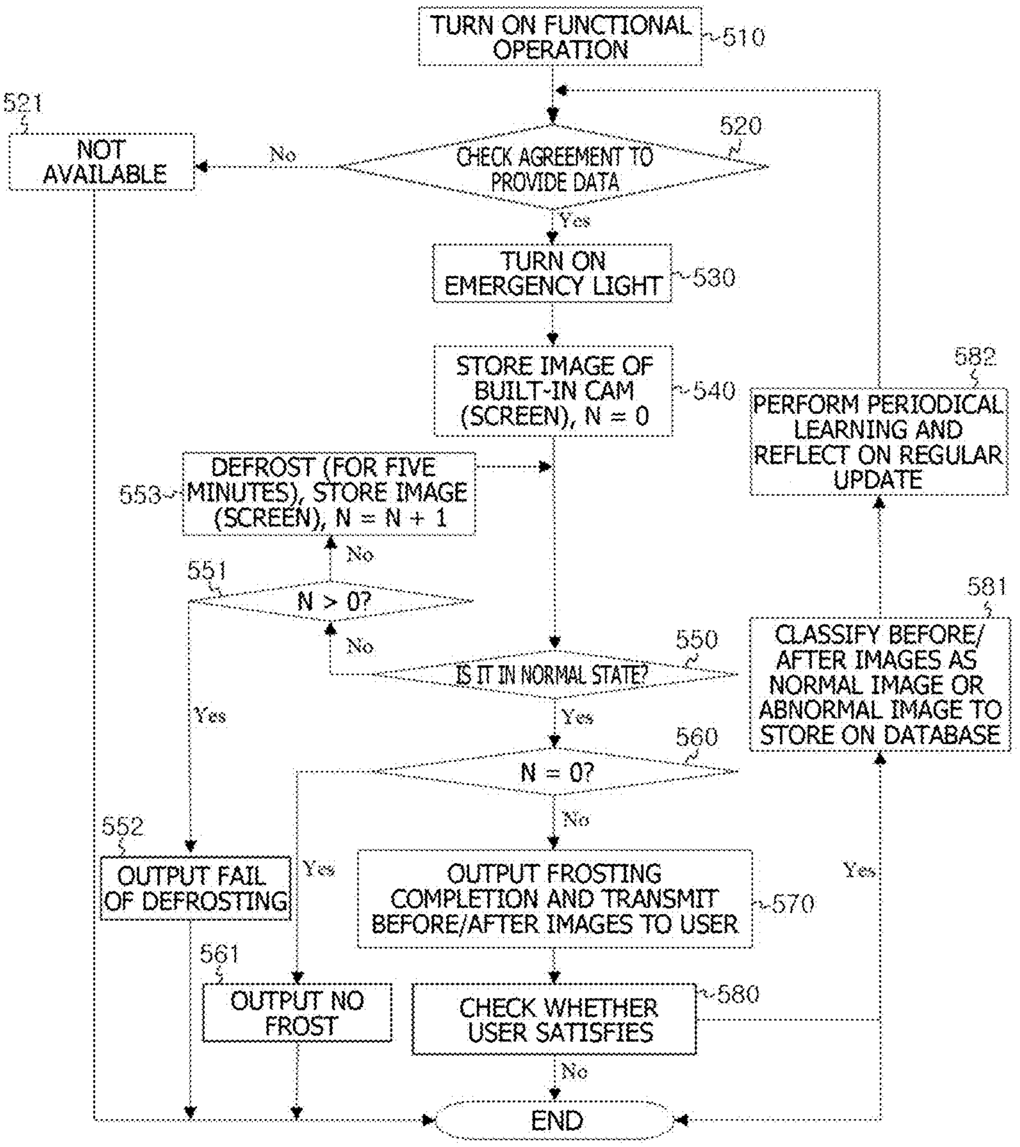
FIG. 5 is a flowchart illustrating the defrosting method for a vehicle according to one embodiment.

FIG. 5 is a flowchart illustrating the defrosting method for a vehicle according to one embodiment.

After a user of the Bluelink™ operates a smart defrosting system, a subsequent process is described with reference to FIG. 5.

In operation 510, the defrosting apparatus for a vehicle may turn a functional operation on.

According to one embodiment, when the defrosting apparatus for a vehicle receives a signal/information for turning the functional operation on from the user terminal or the like, the defrosting apparatus for a vehicle may turn the functional operation on.

In operation 520, the defrosting apparatus for a vehicle may check whether images of a front camera included in the vehicle, which are possessed by the subscriber, are used by Hyundai Kia Motors Company (HKMC) to determine frost and use for training the neural network model.

In operation 521, when the user does not agree, the defrosting apparatus for a vehicle may stop after outputting a pop-up stating that a corresponding function cannot be used through the user terminal or the like.

In operation 530, when the user agrees, the defrosting apparatus for a vehicle may transmit a recent image of the built-in cam (e.g. built-in camera) to the H/U (e.g. ccNC or S-OIP). The defrosting apparatus for a vehicle allows/controls the emergency light to be turned on before the built-in cam captures an image, this is because, when it is complete dark state without nearby lights, it is difficult to distinguish the complete dark state from a frosty state. When the emergency light is turned on, since light emitted by the vehicle is reflected by nearby objects and returned, the number of nearby objects which may be recognized by the built-in cam increases, and thus it is possible to distinguish the frosty state.

In operation 540, in the defrosting apparatus for a vehicle, the H/U may store a received image and set N=0 as an initial state.

In operation 550, the defrosting apparatus for a vehicle may determine whether the received image is in a normal state/abnormal state based on the neural network learning.

In operation 551, the defrosting apparatus for a vehicle may check an N value in the case of the abnormal state (frosty)

In operation 552, when it is N>0, the defrosting apparatus for a vehicle may determine that the frost was not removed even when the defrosting function was operated, and stop after performing control such that "defrosting failed" is output through the user terminal or the like. This situation is to consider a case in which foreign matter other than frost is accumulated on the windshield.

In operation 553, when an N value is zero or less, the defrosting apparatus for a vehicle may perform defrosting for 5 minutes, increases the N value by one, and check whether it is the normal state.

In operation 560, the defrosting apparatus for a vehicle may check whether N=0.

In operation 561, when it is N=0, the defrosting apparatus for a vehicle may determine that frost is not present initially, and stop after outputting "no frost" through the user terminal or the like.

In operation 570, when it is not N=0, the defrosting apparatus for a vehicle may determine that, even when frost is present initially, the frost is removed, and the state becomes the normal state, and stop after outputting a pop-up stating "defrosting completion," transmit images before/after defrosting to the user (subscriber).

In operation 580, in this case, the defrosting apparatus for a vehicle may check whether the user is satisfied before stopping.

In operation 581, when the user is satisfied, the defrosting apparatus for a vehicle may determine the before/after images as highly reliable data helpful for training the neural network and collect the before/after images to use in the training.

In operation 582, although the defrosting apparatus for a vehicle uses data collected by HKMC in the training of the initial neural network, after that, data collected from the subscriber may be additionally reflected in the training to improve reliability. The additional data may be reflected at a time of regular update.

FIGS. 6A to 6C are views illustrating the defrosting method for a vehicle according to one embodiment.

According to one embodiment, the defrosting apparatus for a vehicle may apply semi-supervised learning and add some conditions to improve reliability, which is different from a method of distinguishing frost of a windshield based on a convolution neural network which is supervised learning.

Referring to FIG. 6A, a picture for describing semi-supervised learning of the defrosting apparatus for a vehicle is shown. The semi-supervised learning may be used in a case, in which only some pieces of learning data are correct answers (labeling), and applied in a situation, in which there is large data, to solve a portion having a difficulty in labeling. The defrosting apparatus for a vehicle may perform model learning based on the data having the small numbers of the correct answers, estimate data without having correct answers, and change pieces of data having a high probability value among them into correct answer data.

According to one embodiment, the defrosting apparatus for a vehicle may label on ▲/● among ✱/▲/●, and determine whether pieces of ✱ are similar to ◆/● to label on the pieces of ✱.

When this is applied to the defrosting apparatus for a vehicle, the defrosting apparatus for a vehicle may start learning based on pieces of data which are clearly the normal state (frost X) and the abnormal state (frost O) to relieve a burden of labeling [0 1] or [1 0] on all pieces of data and increase accuracy.

Referring to FIG. 6B, the defrosting apparatus for a vehicle may provide a method of adding a weather condition, which is weather at a place at which the vehicle is parked and which is viewed through an application of a subscriber (the user of the vehicle) of the Bluelink™, to the block diagram. Since frost is not present when the weather is very warm, the defrosting apparatus for a vehicle may detect a situation in which frost seems to be present but is not present actually, etc.

Referring to FIG. 6C, the defrosting apparatus for a vehicle may provide an "image around my vehicle" function of the Bluelink™. In the case of this function, a possibility of wrong decision may be reduced by increasing the diversity of surrounding situations using all images captured by cameras mounted on the vehicle. The defrosting apparatus for a vehicle may learn collected image as well as an image around my vehicle based on the neural network model.

Figure 7:
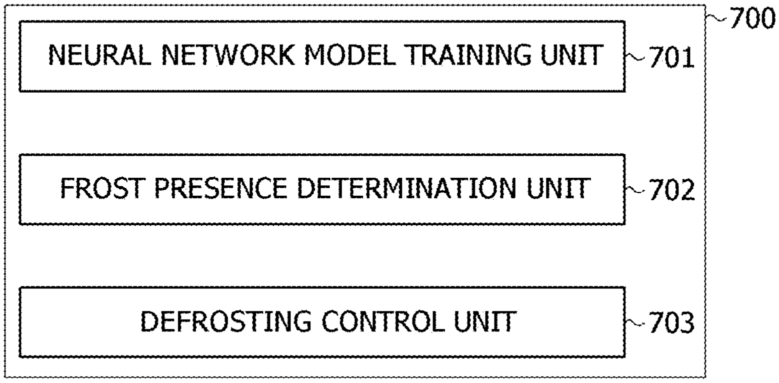
FIG. 7 is a block diagram illustrating a defrosting apparatus for a vehicle according to one embodiment.

FIG. 7 is a block diagram illustrating the defrosting apparatus for a vehicle according to one embodiment.

According to one embodiment, a defrosting apparatus 700 for a vehicle may include a neural network model training module 701 which trains a neural network model with collected image data, a frost presence determination module 702 which determines whether frost is present on a glass of a vehicle based on the trained neural network model, and a defrosting control module 703 which defrosts according to whether the frost is present.

Each of the above modules may constitute units and/or devices of a defrosting apparatus 700 of the vehicle, where the defrosting apparatus 700 may comprise a controller. For example, the above modules of the defrosting apparatus 700 may constitute hardware components that form part of a controller (e.g., modules or devices of a high-level controller), or may constitute individual controllers each having a processor and memory. The defrosting apparatus 700 may include one or more processors and memory.

According to one embodiment, the frost presence determination module 702 may further include a vehicle glass image capturing module (not shown) for capturing an image of the glass of the vehicle using a camera mounted in the vehicle and determine whether frost is present using the image of the glass of the vehicle.

According to one embodiment, cameras mounted in the vehicle may include a camera mounted in the vehicle or black box, and the glass of the vehicle may include a windshield of the vehicle.

According to one embodiment, the frost presence determination module 702 may determine whether frost is present on the glass of the vehicle using an artificial intelligence or a neural network. When the frost is present on the glass of the vehicle, the frost presence determination module 702 may determine that the glass is abnormal, and when the frost is not present on the glass of the vehicle, the frost presence determination module 702 may determine that the glass is normal.

According to one embodiment, the collected image data may include an image of the glass of the vehicle obtained through the camera mounted on the vehicle while the vehicle travels.

According to one embodiment, the frost presence determination module 702 may further include an emergency light control module (not shown) which performs control such that an emergency light is automatically turned on when an illumination of surroundings of the glass of which an image is captured or the camera mounted on the vehicle is a preset illumination threshold or lower.

According to one embodiment, the defrosting apparatus 700 may further include a user terminal signal reception module (not shown) which receives from the user terminal a signal to request for removing or checking frost.

According to one embodiment, the defrosting apparatus for a vehicle may provide an algorithm which analyzes an image of a built-in camera based on a convolution neural network to distinguish a state in which the windshield of the vehicle is covered with frost so as to defrost in advance before a driver gets into the vehicle.

According to one embodiment, when the defrosting starts after the driver got into the vehicle, it typically takes a long time, however, when the present disclosure is applied, the defrosting apparatus for a vehicle has an effect of providing convenience so that the driver can start driving immediately after arriving by defrosting before getting into the vehicle.

In addition, according to one embodiment, the defrosting apparatus for a vehicle has an advantage that tools for spraying water or using a scrapper, an anti-frost cover, a space for storing the tools, and a time are not required when compared to a case in which above-described items are required.

In addition, according to one embodiment, since the defrosting apparatus for a vehicle uses the built-in cam, the H/U, Bluelink™, and Defrost, additional costs are not incurred.

In addition, according to one embodiment, at the present time at which an artificial intelligence emerges as a future industry, when the smart system of the present disclosure is applied to the defrosting apparatus for a vehicle, our technology may gain an advantage over other companies.

Terms such as "module" used in the present embodiment refer to software or a hardware component such as a field-programmable gate array (FPGA) or an application-specific integrated circuit (ASIC), and objects termed "module" perform certain roles. However, the term "module" is not limited to software or hardware. A "module" may reside on an addressable storage medium or to operate one or more processors. Thus, as an example, the term "module" includes components such as software components, object-oriented software components, class components, and task components, processes, functions, properties, procedures, subroutines, segments of program codes, drivers, firmware, microcodes, circuits, data, data bases, data structures, tables, arrays, and variables. Functions provided by these components and "modules" may be combined into a smaller number of components and "modules" or may be subdivided into additional components and "modules." Furthermore, the components and "modules" may also be implemented to operate one or more central processing modules (CPUs) within a device or a security multimedia card.

While the present disclosure has been described above with reference to exemplary embodiments, it may be understood by those skilled in the art that various modifications and changes of the present disclosure may be made within a range without departing from the spirit and scope of the present disclosure defined by the appended claims.

What is claimed is:

1. A defrosting method for a vehicle, the defrosting method comprising:
training a neural network model with collected image data;
determining whether frost is present on a glass of the vehicle based on the trained neural network model, wherein the frost is a deposit of ice crystals formed on the glass when an air temperature falls below a freezing temperature of water; and
performing control of defrosting of the vehicle according to whether the frost is present.

2. The defrosting method of claim 1, wherein determining whether the frost is present on the glass further includes:
capturing an image of the glass of the vehicle using a camera; and
determining whether the frost is present using the captured image of the glass of the vehicle.

3. The defrosting method of claim 2, wherein:
the camera is mounted in the vehicle or a black box; and
the glass of the vehicle includes a windshield of the vehicle.

4. The defrosting method of claim 1, wherein:
determining whether the frost is present on the glass includes determining whether the frost is present on the glass of the vehicle using an artificial intelligence or a neural network;
wherein when the frost is present on the glass of the vehicle, it is determined that the glass is in an abnormal state; and
wherein when the frost is not present on the glass of the vehicle, it is determined that the glass is in a normal state.

5. The defrosting method of claim 1, wherein the collected image data include an image of the glass of the vehicle obtained through a camera mounted on the vehicle while the vehicle travels.

6. The defrosting method of claim 2, wherein the capturing of the image of the glass further includes performing control such that an emergency light is automatically turned on when an illumination of surroundings of the camera mounted on the vehicle or surroundings of the glass of which an image is to be captured is a preset illumination threshold or lower.

7. The defrosting method of claim 1, further comprising:
receiving, from a user terminal, a signal to request removing or checking frost.

8. A defrosting apparatus for a vehicle, the defrosting apparatus comprising:
a neural network model training module configured to train a neural network model with collected image data;
a frost presence determination module configured to determine whether frost is present on a glass of the vehicle based on the trained neural network model, wherein the frost is a deposit of ice crystals formed on the glass when an air temperature falls below a freezing temperature of water; and
a defrosting control module configured to control defrosting according to whether the frost is present.

9. The defrosting apparatus of claim 8, wherein the frost presence determination module further includes a vehicle glass image capturing module which captures an image of the glass of the vehicle using a camera, and determines whether frost is present using the captured image of the glass of the vehicle.

10. The defrosting apparatus of claim 9, wherein:
the camera is mounted in the vehicle or a black box; and
the glass of the vehicle includes a windshield of the vehicle.

11. The defrosting apparatus of claim 8, wherein:
the frost presence determination module determines whether frost is present on the glass of the vehicle using an artificial intelligence or neural network;
when the frost is present on the glass of the vehicle, it is determined that the glass is in an abnormal state; and
when the frost is not present on the glass of the vehicle, it is determined that the glass is in a normal state.

12. The defrosting apparatus of claim 8, wherein the collected image data include an image of the glass of the vehicle obtained through the camera mounted in the vehicle while the vehicle travels.

13. The defrosting apparatus of claim 9, wherein the frost presence determination module further includes an emergency light control module which performs control such that an emergency light is automatically turned on when an illumination of surroundings of the camera mounted on the vehicle or surroundings of the glass of which an image is to be captured is a preset illumination threshold or lower.

14. The defrosting apparatus of claim 8, further includes a user terminal signal reception module which receives from a user terminal a signal to request for removing or checking frost.

15. The defrosting apparatus of claim 8, wherein the neural network model training module, the frost presence determination module, and the defrosting control module constitute individual controllers of the defrosting apparatus.

16. The defrosting apparatus of claim 8, wherein the neural network model training module, the frost presence determination module, and the defrosting control module constitute a single controller of the defrosting apparatus.

17. A vehicle comprising the defrosting apparatus of claim 8.

* * * * *